United States Patent [19]

Faust et al.

[11] Patent Number: 4,473,127

[45] Date of Patent: Sep. 25, 1984

[54] MULTIPLE-LINK ARTICULATED BUS

[75] Inventors: Hagin Faust; Hans J. Drewitz, both of Munich, Fed. Rep. of Germany

[73] Assignee: Man Maschinenfabrik Augsburg-Nurnberg AG, Munich, Fed. Rep. of Germany

[21] Appl. No.: 407,864

[22] Filed: Aug. 13, 1982

[30] Foreign Application Priority Data

Aug. 18, 1981 [DE] Fed. Rep. of Germany ....... 3132627

[51] Int. Cl.³ ............................................. B62D 53/00
[52] U.S. Cl. .................................... 180/14.1; 280/408
[58] Field of Search ............. 180/14 R; 280/408, 403, 280/432

[56] References Cited

U.S. PATENT DOCUMENTS 2,407,007 9/1946 Henrichsen ......................... 280/403
4,313,615 2/1982 Simon ................................. 280/432

FOREIGN PATENT DOCUMENTS 211681 6/1958 Austria ............................... 280/403
370159 4/1939 Italy ................................... 280/403

Primary Examiner—Joseph F. Peters, Jr.
Assistant Examiner—Donn McGiehan
Attorney, Agent, or Firm—Alan H. Levine

[57] ABSTRACT

A bus having at least three pivotally-connected vehicle members, one of which has two axles spaced from each other, one of these axles being a steering axle. Each of the other vehicle members has a single axle. An engine in the tail vehicle member drives all the live axles through a train of articulated shafts.

7 Claims, 3 Drawing Figures

MULTIPLE-LINK ARTICULATED BUS

This invention relates to a multiple-link articulated bus having at least three vehicle members, one of which is supported on the road by means of at least one live axle and a steering axle spaced from the live axle.

In a known three-link articulated bus, the two end members are two-axle vehicles suspended between which is a central member, having no wheels of its own, and suspended by the two end members by means of a saddle bearing. Multiple-link articulated buses of this category afford considerable hauling capacity previously associated only with track-bound vehicles. The known version of a multiple-link articulated bus provides an additional advantage in that it can be operated in either direction of travel, if two driver cabins are provided.

A disadvantage accompanying this known version of a multiple-link articulated bus are the difficult and spacious arrangements that must be made to accommodate the engine, and the need for a tracking arrangement if the vehicle is to operate within a reasonable width of roadway. If the vehicle is to operate without tracking provisions, the turning circle requirement for traffic on public roads can be met only if all axles of the vehicle are steerable, which requires a very complex arrangement. Additionally, provisions for limiting the buckling angle must be made in the interest of sufficient road stability and operational reliability of the articulated bus especially when used on narrow routes, e.g., in downtown areas.

In a broad aspect, the present invention provides a multiple-link articulated bus of the general type described which has high passenger capacity, can be operated without tracking arrangements, and wherein the cost of manufacture of the bus is kept low by the use of components employed in simple state-of-art articulated buses.

It is a particular object of the present invention to provide a multiple-link articulated bus of the general type described wherein each of the vehicle members, other than the one having a live axle and a steering axle, has a single axle at least one of which is live, and an engine in the tail vehicle member drives all the live axles.

The vehicle of the present invention provides considerable hauling capacity with substantial maneuverability and without the need for any tracking provisions. It provides another, considerable advantage in that propulsion via several axles gives welcome stability in travel. At the same time, fabrication effort required to achieve such stability is kept at a low level by arranging a single engine in the rear end of the tail member, from which all axles are driven through a train of articulated shafts. The need for buckling angle limitation is obviated. Another merit of this arrangement is that it permits the floor of the vehicle to be lowered.

A preferred basic configuration of the articulated bus of the present invention involves three vehicle members, the leading member of which being the two-axle member followed by two single-axle vehicle members. For economy of construction, it is advantageous to drive the axle of the second or the third vehicle member in addition to the rear axle of the two-axle vehicle member, the nondriven axle of the second or third vehicle member being a steering axle. In this manner, the use of a driven steering axle is avoided, which in turn enables the drive axles to use twin tires and so carry a greater portion of the load.

If an articulated bus of the present invention is to have more than three vehicle members, it will be advantageous to have the two-axle vehicle preceded by a single-axle vehicle member having a steering axle.

Illustrative embodiments of the present invention are described more fully with reference to the accompanying drawings, in which.

Figure 1:
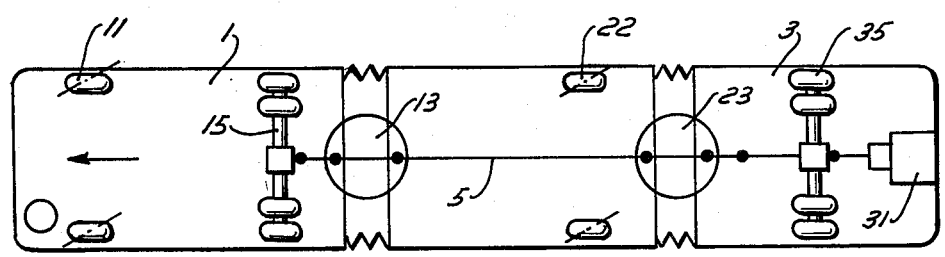
FIG. 1 is a schematic plan view illustrating a three-member articulated bus according to the present invention.

With reference now to FIG. 1, a three-link articulated bus shown in plan view comprises a two-axle leading member 1, a single-axle central member 2, and a single-axle tail member 3. Arranged in the rear of the tail member 3 is an engine 31 to drive the bus. The engine 31 drives a live axle 35 of the tail member 3 through a gearbox, and from there the rear live axle 15 of the leading member 1 through a train of articulated shafts 5. For this purpose, the train of articulated shafts 5 crosses a pivot joint 13 arranged between the leading member and the central member of the vehicle, and a pivot joint 23 arranged between the central member and the tail member of the vehicle. The axle of the central member 2 is a steering axle 22. The front axle 11 of the leading member 1 of the articulated bus is a steering axle as well.

Figure 2:
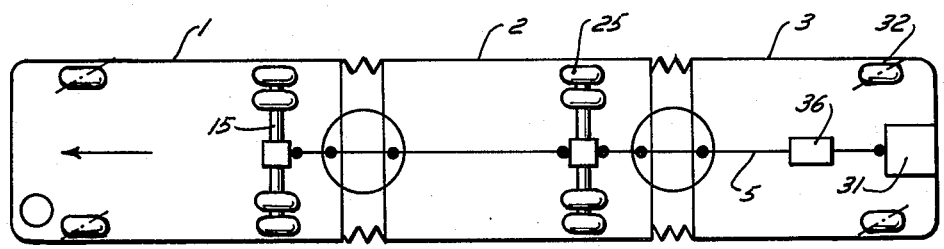
FIG. 2 is a view similar to FIG. 1 illustrating another configuration of a three-link articulated bus according to the invention.

The configuration of a three-link bus as shown in FIG. 2 provides an optimum solution as regards road stability and construction investment. In this configuration, the axle 25 of the central member 2 is a drive or live axle in addition to the rear axle 15 of the leading member 1, while the axle of the tail member 3 is a nondriven steering axle 32. In other aspects the bus of FIG. 2 is similar to that of FIG. 1. Power to drive the two axles 15 and 25 again comes from an engine 31 arranged in the rear of the tail member 3, the engine driving axles 15 and 25 through a train of articulated shafts 5. It has been shown that a three-link articulated bus of this configuration can be operated in the absence of any additional protective provisions and gives excellent road stability at both low and high speeds alike plus a great degree of maneuverability making it suitable for narrow and winding roads.

In a further advantageous aspect of the present invention, the reduction gear 36 normally intervening between the engine and the live axles, which may be an automatic transmission with a torque converter or alternatively a change-speed gear, is arranged, as indicated in FIG. 2, apart from the engine block for improved distribution of axle loads. It is advantageous also, with a view to the space available in the tail member of the articulated bus, if the reduction gearbox 36 is arranged separately from the engine.

Figure 3:
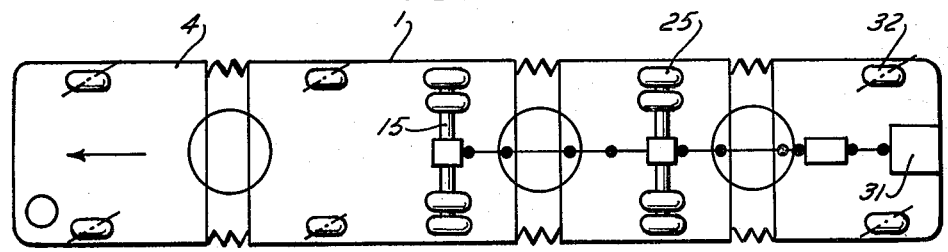
FIG. 3 is a schematic plan view illustrating a four-link articulated bus according to the invention.

The four-link articulated bus illustrated in FIG. 3 comprises a three-link vehicle, such as shown in FIG. 2, and a head member 4 preceding the two-axle vehicle member 1. The axle of the head member 4 is a steering axle.

The multiple-link articulated bus configurations illustrated in FIGS. 1 to 3 are basic configurations. The vehicle elements used therein can also be combined to form other configurations, although there will be penalties with respect to construction investment and road stability. Worth special attention is still another configuration in which all axles of the vehicle are steering axles. While such a vehicle will give maximum maneuverability and optimum tracking properties for all axles, its construction will be accordingly more complex.

The inventive concept also embraces configurations in which one or more individual axles of the vehicle are each replaced with a tandem (double) axle. This enables a heavier load to be supported on the roadway in a transverse plane of the vehicle.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A multi-link articulated bus comprising:
    at least three pivotally-connected vehicle members,
    one of the vehicle members having two axles spaced from each other, one of which is a steering axle,
    each of the other vehicle members having only a single axle,
    at least one of the vehicle axles being a live axle,
    an engine in the tail vehicle member, and
    transmission means for driving all the live axles from the engine.

2. A multi-link articulated bus as defined in claim 1 wherein said one vehicle member has a live axle.

3. A multi-link articulated bus as defined in claim 2 wherein one of said other vehicle members has a live axle.

4. A multi-link articulated bus as defined in claim 1 or claim 2 or claim 3 wherein the tail vehicle member has a steering axle.

5. A multi-link articulated bus as defined in claim 1 wherein said one vehicle member is the lead vehicle member.

6. A multi-link articulated bus as defined in claim 5 wherein the tail vehicle member has a steering axle, and a central vehicle member has a non-steering live axle.

7. A multi-link articulated bus as defined in claim 1 including a lead vehicle member in front of said one vehicle member, the lead vehicle member having a single steering axle.

* * * * *